United States Patent [19]

Levi

[11] 3,973,926
[45] Aug. 10, 1976

[54] PROCESS AND EQUIPMENT FOR THE MAGNETIC SEPARATION OF ISOTOPES

[75] Inventor: Enrico Levi, Forest Hills, N.Y.

[73] Assignee: Advanced Technology Laboratories, Inc., Westbury, N.Y.

[22] Filed: Jan. 23, 1974

[21] Appl. No.: 435,891

[52] U.S. Cl. .......................................... 55/3; 55/100
[51] Int. Cl.² ............................................ B03C 1/00
[58] Field of Search ............... 55/2, 3, 17, 100, 136; 210/222, 223; 250/251; 335/210

[56] References Cited
UNITED STATES PATENTS

| | | | |
|---|---|---|---|
| 2,533,966 | 12/1950 | Simmons, Jr. | 55/3 |
| 2,607,439 | 8/1952 | Dickens et al. | 55/17 |
| 3,177,633 | 4/1965 | McDonald, Jr. | 55/3 |
| 3,277,631 | 10/1966 | Sunnen | 55/3 |
| 3,443,087 | 5/1969 | Robieux et al. | 55/2 |
| 3,511,776 | 5/1970 | Avampato | 210/222 |

Primary Examiner—Bernard Nozick

[57] ABSTRACT

A method by which particle separation is accomplished by taking advantage of the large difference in the diffusion rates between the ionized and neutral components of a gaseous mixture, in the presence of a magnetic field. Means for separating isotopes in a continuous and commercially successful manner. Apparatus in which the desired component is selectively ionized, accelerated and guided by a magnetic field along a predetermined axis, while the neutral particles are transversely removed by means of vacuum or cryogenic pumps.

10 Claims, 4 Drawing Figures

PROCESS AND EQUIPMENT FOR THE MAGNETIC SEPARATION OF ISOTOPES

BACKGROUND OF THE INVENTION

In carrying out industrial processes, it is often essential to separate a specific component from a mixture of gases or metal vapors. The difficulty is compounded in the case of mixtures of nuclear isotopes, because of their identical chemical properties. Heretofore, the separation of isotopes was accomplished physically by taking advantage of the small difference in the weights of the isotopes.

The most important applications of this principle are:
1. gaseous diffusion in which the mixture is passed through thousands of stages containing porous barriers,
2. gas centrifugation in which the mixture is spun at very high speed, and
3. electromagnetic separation in which the whole mixture is ionized, accelerated by an electric field and selectively deflected by a magnetic field.

These conventional methods for achieving separation of isotopes have been very wasteful in the usage of electric power. At the same time, the apparatus used for carrying out the conventional methods was complex in design and particularly costly to construct.

Recent technological developments have rendered the selective ionization of a specific isotope economically feasible. However, since the charge is easily transferred from the ionized to the neutral component, quick separation is required. The currently employed process makes use of an electric field in order to accelerate, and thus separate, the ionized component. The electrons and ions thus accelerated subject the neutral background to an energetic bombardment which leads to its partial ionization, and consequently imposes severe limitations on the purity of the output product and on the efficiency of the process.

Accordingly, it is an object of the present invention to provide a method for the separation of components from a mixture of gases or vapors, which results in substantially high purity of the separated components.

Another object of the present invention is to provide a process for the separation of components from a mixture of gases or vapors which is efficient in terms of energy consumption.

Another object of the present invention is to provide an arrangement for the separation of components from a mixture of gases or vapors, which is simple in construction and may be economically fabricated.

A still further object of the present invention is to provide an arrangement of the foregoing character, which is highly reliable in operation and has a substantially long operating life.

SUMMARY OF THE INVENTION

The objectives of the present invention are achieved by providing an arrangement in which a magnetic field of appropriate configuration is used to accelerate and guide the selected component.

A typical arrangement consists of a vacuum chamber subdivided into two sections by means of a baffle which maintains a predetermined pressure difference between the two sections of the vacuum chamber. The mixture in the gaseous or vapor state is admitted into a first section in which a magnetic field of substantially high intensity is maintained. A magnetic field is also maintained in the second adjoining section, but the intensity of the magnetic field in the second chamber is substantially less than the magnetic field intensity in the first chamber.

A gas or vapor mixture is selectively ionized in the first chamber, and the ionized or charged particles are accelerated along an axis through both sections of the vacuum chamber. The neutral particles are not accelerated along with the charged particles, and they are removed transversely from both sections by means of vacuum or cryogenic pumps communicating with these.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
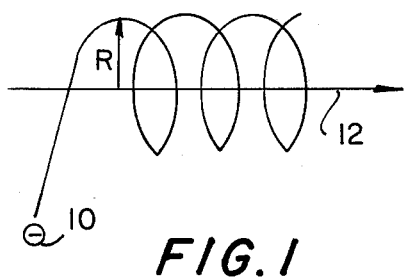
FIG. 1 is a schematic diagram showing the motion of a charged particle in relation to an applied magnetic field, in accordance with the present invention.

Referring to the drawing, FIG. 1 shows the path of motion of a charged particle 10 when subjected to the application of a magnetic field 12 having a flux density or strength B. As a result of the action of the magnetic field, the charged particle 10 is forced to execute a tight orbit around the magnetic force lines having the direction shown in the drawing.

In its ideal path of motion, the radius of gyration is given by $R = mv/qB$ where $m$ is the mass of the particle, $v$ is the velocity of the particle, $q$ is its charge, and $B$ is the magnetic field intensity. In a typical magnetic field of one Tesla, an electron at room temperature has a radius of gyration of less than one micron. From this numerical example, it may be seen therefore, that the electron threads very close to a magnetic field line. At the same time, the electron or charged particle is prevented from moving across the magnetic field.

In a static magnetic field, the motion of a charged particle is characterized by two constants which are the magnetic moment and the kinetic energy.

The magnetic moment is given by $M = W_p/B$ where $Wp$ is the kinetic energy associated with the velocity component perpendicular to the magnetic field.

The kinetic energy is given by the relationship $W = W_p + W_a$, where $W_a$ is the kinetic energy associated with the velocity component parallel to the magnetic field.

Figure 2:
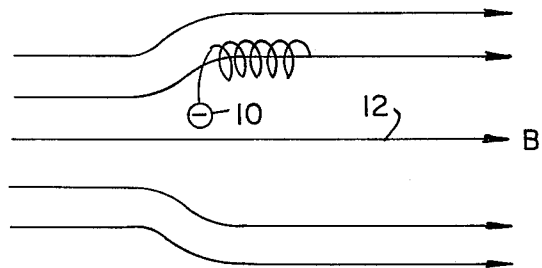
FIG. 2 is a schematic diagram of the magnetic field configuration forming a magnetic nozzle for accelerating a charged particle along a predetermined direction.

If, now, a magnetic field is generated as shown in FIG. 2 so as to conform to the configuration of a magnetic bottle, for example, the following relationships prevail when considering the motion of a charged particle towards the "neck" of the magnetic bottle, corresponding to the region where the magnetic field is stronger and the magnetic field lines are more crowded or have a greater density. This crowding of the magnetic field lines towards the neck of the magnetic bottle is illustrated in FIG. 2.

Since the magnetic moment remains constant, an increase in the field intensity B forces a proportional increase in $W_p$, the kinetic energy associated with the velocity component perpendicular to the magnetic field. Thus, as the field intensity increases towards the neck of the magnetic bottle, the velocity component of the charged particle perpendicular to the magnetic field, increases as the square root of $b$.

Since the total kinetic energy must also remain constant, an increase in $W_p$ must be offset by a corresponding decrease in $W_a$, the kinetic energy associated with the velocity component parallel to the magnetic field.

Accordingly, with the resultant decrease in $W_a$, the motion of the charged particle is slowed down along the magnetic field.

If, now, the increase in the magnetic field intensity $B$ is made substantially large, the particle is slowed sown to zero velocity and is then reflected back with reversed motion, similar to the effect obtained by a mirror. Thus, this action corresponds to a magnetic mirror effect. As a result of this effect, the charged particles are confined to a region of substantially "minimum field intensity $B$". If the bottle is made open-ended, the charged particles are then accelerated in the direction of decreasing field intensity $B$. The resultant effect of such acceleration in the direction of decreasing $b$, corresponds in the accelerating effect that takes place of a gas, for example, through a divergent nozzle in the supersonic regime.

With the acceleration to substantial high velocities of the charged particles in the direction of decreasing $B$, the charged particles thread extremely close to the magnetic field line, while being inhibited from crossing the field lines. The neutral particles, however, remain unaffected by the presence of the magnetic field, and they are therefore free to move across the magnetic field lines and against the magnetic field intensity gradient.

Since the neutral particles are thereby not accelerated along with the charged particles because they remain unaffected by the magnetic field, the neutral particles can be separated from the charged or ionized particles, by simply pumping the neutral particles out of the paths of the charged particles.

Figure 4:
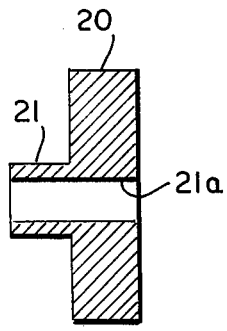
FIG. 4 is a detail view in cross-section of the baffle element used in the present invention.

The apparatus for achieving the conditions illustrated in FIG. 2, is comprised essentially of a vacuum chamber 14 which is subdivided into two sections 16 and 18. The separation of the two sections 16 and 18 is provided by a baffle 20 which maintains a predetermined pressured difference between the two sections. This pressure difference serves to diminish the chances of charge transfer to the neutral component in section 18. Baffle 20 is a blind plate having a cylindrical nipple 21 (FIG. 4) and a bore 21a passing through the plate and nipple.

Communicating with each sections 16 and 18, is a vacuum or cryogenic pump 22 and 24, respectively. These two pumps maintain substantial vacuum within these two sections of the vacuum chamber. Appropriate vacuum seals are provided between all flanges, and typical seals 20a are shown on either side of baffle 20.

A magnetic field intensity of predetermined magnitude is maintained in the first section 16, by means of magnetic coils 26. Magnetic coils 28 also maintain a magnetic field in the section 18 of the vacuum chamber. However, the magnetic coils 28 are arranged with respect to the section 18 so that the magnetic field intensity in section 18 is substantially less than the magnetic field intensity in section 16. This relationship between the magnetic field intensities in the two sections 16 and 18, is illustrated in the drawing by the relative spacing of the magnetic coils 26 and 28.

In operation of the arrangement, in accordance with the present invention, a gas or vapor mixture having components to be separated therefrom, is admitted into section 16 by means of inlet 30. The mixture is then passed through a nozzle 32 within the section 16, and is selectively ionized. Selective ionization of a gas or vapor mixture is well known in the art and is, for this reason, not further described here. However, reference is hereby made to U.S. Pat. No. 3,443,087, issued to Robieux et al., on May 6, 1969 for a suitable selective ionizer structure.

After ionization, the charged particles are accelerated along the longitudinal axis 34 passing through both sections 16 and 18, as a result of the action of the magnetic fields provided by magnetic coils 26 and 28.

After having been accelerated through the section 18, in a manner described above in conjunction with the field configuration of FIG. 2, the charged particles are removed through outlet 36 communicating with section 18.

The neutral particles, which remain unrestrained by the magnetic fields maintained by coils 26 and 28, are pumped out of section 16 by means of the vacuum pump 22. This leaves the ionized gas or vapor component relatively free from neutral particles when passing from section 16 to section 18. Any neutral particles which are still carried along by the ionized component when passing from section 16 to section 18, is then removed by means of pump 24. As a result, the ionized gas or vapor component exiting from the vacuum chamber through outlet 36, is in substantially pure form.

Since magnetic confinement is degraded, when the particles undergo collisions among themselves, the gas mixture is admitted into section 16 at a pressure below 1 torr. (mm-Hg) The neutral gas pressure in the second section 18 may be as low as $10^{-7}$ torr.

The material used for the vacuum chamber is dependent upon the chemical properties of the gas mixture. Thus, typical materials which may be used for this purpose, are stainless steel, glass, quartz, and ceramic materials, for example.

The radius of the vacuum chamber must be at least one order of magnitude larger than the radius of gyration of the ions. In practice, the overall dimensions are determined by the output rate, and they are limited by the capacity of the selective ionizer. Possible dimensions for such a vacuum chamber are 2 meters in length and 15 centimeters in diameter, with the bore 21a being about 12 mm.

The efficiency of the magnetic separation process is effected by ion loss processes, such as diffusion, recombination, and charge exchange. All of these processes result from collisions, and they impose an upper limit on the operating pressure of the first section 16, as described above. To minimize these losses, the ionized component must be removed substantially quickly from the first section 16 and transferred to the second section 18. Such rapid transfer is achieved through the application of the magnetic configuration of FIG. 2 which results in acceleration of the ionized particles. The arrangement of the magnetic coils 26 and 28 with respect to sections 16 and 18 is such that the magnetic field intensity is made substantially larger near the gas mixture inlet, so as to create a divergent pattern of field intensity lines B, and thereby simulate the effect of a supersonic divergent nozzle.

Figure 3:
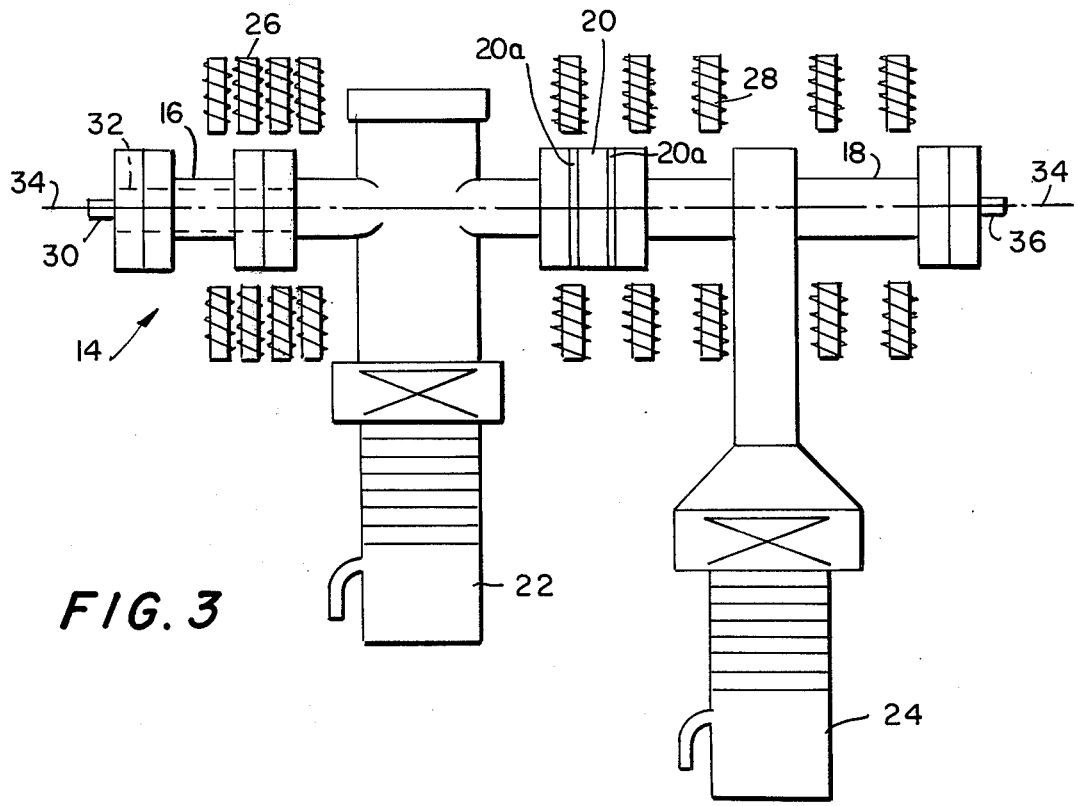
FIG. 3 is a schematic diagram of the apparatus for maintaining magnetic fields of predetermined intensities within sections of a vacuum chamber, in accordance with the present invention.

As an example of the present invention, a natural mixture of $U_{235}$ and $U_{238}$ containing 0.7% $U_{235}$ can be subjected to one pass through the apparatus of FIG. 3 to obtain a mixture containing 90–95% $U_{235}$.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A method for continuously separating charged particles from neutral particles comprising the steps of:
   a. introducing a gaseous mixture into a conduit;
   b. ionizing selectively the mixture of gases within said conduit to form selected charged and neutral particles;
   c. generating magnetic fields in first upstream and second downstream sections of said conduit and passing said ionized mixture of gases therethrough,
      1. the magnetic field intensity in the first section being substantially greater than the magnetic field intensity in the second section;
   d. establishing a restriction means between said two sections to maintain a pressure differential therebetween;
   e. accelerating said charged particles along an axis through said first and second sections;
   f. removing said neutral particles by pump means in a path outwardly and transverse to the axis of travel of said charged particles while said charged particles are being accelerated;
   g. maintaining a pressure in said conduit of less than one Torr.;
   h. and removing said charged particles substantially free of said neutral particles.

2. The method as defined in claim 1 wherein the motion of said charged particles through said magnetic field simulates the motion of a gas through a supersonic divergent nozzle.

3. The method as defined in claim 1 wherein said charged particles execute a helical path of motion substantially close to the magnetic lines of force.

4. The method as defined in claim 1 wherein the magnetic field intensity is in the form of a divergent pattern through said second section.

5. An arrangement for separating charged particles from neutral particles comprising, in combination;
   a. a vacuum chamber including a first upstream section and a second downstream section;
   b. ionizing means in said vacuum chamber upstream of said sections for selectively ionizing a gaseous mixture in said vacuum chamber into charged and neutral particles;
   c. electromagnetic means on said vacuum chamber's first and second sections for generating in said vacuum chamber a magnetic field,
      1. said electromagnetic means establishing a magnetic field intensity in the first section which is substantially greater than the magnetic field intensity in the second section of said vacuum chamber;
      2. whereby said magnetic field accelerates said charged particles along an axis through said first and second sections;
   d. baffle means between said first and second sections for maintaining a pressure differential therebetween,
   e. pumping means connected with the vacuum chamber for establishing a pressure of less than one Torr. in said vacuum chamber and including an outlet connected to the outer portion of said vacuum chamber for removing neutral particles therefrom;
   f. and means adjacent the axis of the vacuum chamber for removing said charged particles from said vacuum chamber.

6. The arrangement as defined in claim 5 wherein said vacuum chamber has the following typical dimensions: a length of substantially 2 meters and a diameter of substantially 15 centimeters.

7. The arrangement as defined in claim 5 wherein said baffle means maintains a predetermined pressure difference between said first and second portions of said vacuum chamber.

8. The arrangement as defined in claim 5 wherein said electromagnetic means comprises first magnetic coils on said first portion and second magnetic coils on said second portion of said vacuum chamber, said first magnetic coils producing a magnetic field of substantially greater intensity than the magnetic field produced by said second magnetic coils.

9. The arrangement as defined in claim 5 wherein said pumping means comprises vacuum or cryogenic pumping means.

10. The arrangement as defined in claim 5 wherein the motion of said charged particles through said vacuum chamber simulates the passage of a gas through a supersonic divergent nozzle.

* * * * *